(12) United States Patent
Collier-Hallman (10) Patent No.: US 11,447,175 B2
(45) Date of Patent: Sep. 20, 2022

(54) STEER RATIO SYNCHRONIZATION FOR STEER-BY-WIRE SYSTEMS

(71) Applicant: STEERING SOLUTIONS IP HOLDING CORPORATION, Saginaw, MI (US)

(72) Inventor: Steven J. Collier-Hallman, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 184 days.

(21) Appl. No.: 16/888,838

(22) Filed: May 31, 2020

(65) Prior Publication Data

US 2021/0371007 A1    Dec. 2, 2021

(51) Int. Cl.
*B62D 6/00* (2006.01)
*B62D 5/04* (2006.01)

(52) U.S. Cl.
CPC .......... *B62D 6/002* (2013.01); *B62D 5/0481* (2013.01)

(58) Field of Classification Search
CPC ......... B62D 6/002; B62D 5/0481; B62D 6/02
See application file for complete search history.

(56) References Cited

U.S. PATENT DOCUMENTS 5,174,407 A * 12/1992 Shimizu ................. B62D 1/166
180/444
6,691,009 B1 * 2/2004 Yao ........................ B62D 6/008
701/41

(Continued)

FOREIGN PATENT DOCUMENTS

CN    108778904 A * 11/2018 ........... B62D 5/0409
DE    102012213259 B4 * 9/2016 ............. B62D 6/002

(Continued)

OTHER PUBLICATIONS

"Designing Steering Feel for Steer-by-Wire Vehicles Using Objective Measures;" Avinash Balachandran, J. Christian Gerdes; IEEE/ASME Transactions on Mechatronics (vol. 20, Issue: 1, pp. 373-383); Oct. 17, 2014. (Year: 2014).*

(Continued)

*Primary Examiner* — Khoi H Tran
*Assistant Examiner* — Jorge O Peche
(74) *Attorney, Agent, or Firm* — Dickinson Wright PLLC (57) ABSTRACT

A method for a steer by wire steering system. The method includes determining a difference between a commanded steering ratio and an achieved steering ratio and determining whether the difference between the commanded steering ratio and the achieved steering ratio is greater than a threshold. The method also includes, in response to a determination that the difference between the commanded steering ratio and the achieved steering ratio is greater than the threshold, adjusting the commanded steering ratio to be equal to the achieved steering ratio. The method also includes, in response to a determination that the difference between the commanded steering ratio and the achieved steering ratio is greater than the threshold, selectively adjusting a bandwidth of a filter based on at least one vehicle characteristic of an associated vehicle and adjusting, using the filter, the commanded steering ratio to be equal to a desired steering ratio.

20 Claims, 5 Drawing Sheets

(56) References Cited

U.S. PATENT DOCUMENTS

| | | | | |
|---|---|---|---|---|
| 6,694,239 | B1 * | 2/2004 | Yao | B62D 6/008 |
| | | | | 701/41 |
| 6,718,243 | B1 * | 4/2004 | Yao | B62D 6/002 |
| | | | | 701/41 |
| 6,757,601 | B1 * | 6/2004 | Yao | B62D 6/002 |
| | | | | 701/41 |
| 2001/0027895 | A1 * | 10/2001 | Murata | B62D 1/166 |
| | | | | 180/446 |
| 2004/0064229 | A1 * | 4/2004 | Stout | B62D 6/002 |
| | | | | 180/443 |
| 2004/0138796 | A1 * | 7/2004 | Yao | B62D 5/006 |
| | | | | 180/443 |
| 2017/0036692 | A1 * | 2/2017 | Kojo | B62D 5/008 |
| 2018/0086374 | A1 * | 3/2018 | Sato | B62D 6/10 |
| 2019/0084611 | A1 * | 3/2019 | Klein | B62D 5/0442 |
| 2021/0371007 | A1 * | 12/2021 | Collier-Hallman | |
| | | | | B62D 5/0481 |

FOREIGN PATENT DOCUMENTS

| | | | | |
|---|---|---|---|---|
| EP | 1700773 | A1 * | 9/2006 | B62D 5/008 |
| EP | 2172386 | A1 * | 4/2010 | B62D 15/025 |
| GB | 2582591 | A * | 9/2020 | B62D 6/002 |
| JP | H1178944 | A * | 3/1999 | |
| JP | 2004042795 | A * | 2/2004 | B62D 5/008 |
| JP | 2004042796 | A * | 2/2004 | B62D 5/008 |
| JP | 2007331481 | A * | 12/2007 | B62D 15/0285 |
| JP | 2009051491 | A * | 3/2009 | B62D 15/025 |
| WO | WO-2020198443 | A1 * | 10/2020 | |

OTHER PUBLICATIONS

"Approach to steer-by-wire system design;" M. Bertoluzzo, G. Buja, R. Menis, G. Sulligoi; 2005 IEEE International Conference on Industrial Technology (pp. 443-447); Nov. 24, 2008. (Year: 2008).*

"Modification of vehicle handling characteristics via steer-by-wire;" P. Yih , J.C. Gerdes; IEEE Transactions on Control Systems Technology (vol. 13, Issue: 6, pp. 965-976); Nov. 1, 2005. (Year: 2005).*

"Force-Feedback System Design for the Steer-By-Wire: Optimisation and Performance Evaluation;" D. Gualino, I.-J. Adounkpe; 2006 IEEE Intelligent Transportation Systems Conference (pp. 181-187); Nov. 10, 2008. (Year: 2008).*

* cited by examiner

STEER RATIO SYNCHRONIZATION FOR STEER-BY-WIRE SYSTEMS

BACKGROUND OF THE INVENTION

An electric power steering (EPS) typically includes components such as steering wheel (e.g., or handwheel), column, rack-pinion gear, electric motor actuator, and the like. The EPS assists the driver to steer a vehicle by providing an assist torque. The assist torque is based on a torque applied by the driver (applied torque). In a steady-state sense, the applied torque and assist torque counter the rack force generated due to interaction between tires of the vehicle and the road.

A typical Steer by wire (SbW) system includes a roadwheel actuator (RWA) unit and handwheel (or steering wheel) actuator (HWA) unit. The RWA unit and the HWA unit in the SbW are mechanically disconnected and communicate through controlled area network (CAN) interface (or other similar digital communication protocols). The HWA unit receives a rack force signal from the RWA unit to generate an appropriate torque feel for the driver. Alternatively, the handwheel angle and vehicle speed can also be used to generate desired torque feel to the driver. The angle from HWA unit is sent to the RWA unit, which controls rack travel.

SUMMARY OF THE INVENTION

An aspect of the disclosed embodiments includes a steer by wire steering system. The system includes a processor and a memory. The memory includes instructions that, when executed by the processor, cause the processor to: determine a difference between a commanded steering ratio and an achieved steering ratio; determine whether the difference between the commanded steering ratio and the achieved steering ratio is greater than a threshold; in response to a determination that the difference between the commanded steering ratio and the achieved steering ratio is greater than the threshold, adjust the commanded steering ratio to be equal to the achieved steering ratio; and in response to a determination that the difference between the commanded steering ratio and the achieved steering ratio is not greater than the threshold, selectively adjust a bandwidth of a filter based one at least one vehicle characteristic of an associated vehicle and adjust, using the filter, the commanded steering ratio to be equal to a desired steering ratio.

Another aspect of the disclosed embodiments includes a method for a steer by wire steering system. The method includes determining a difference between a commanded steering ratio and an achieved steering ratio and determining whether the difference between the commanded steering ratio and the achieved steering ratio is greater than a threshold. The method also includes, in response to a determination that the difference between the commanded steering ratio and the achieved steering ratio is greater than the threshold, adjusting the commanded steering ratio to be equal to the achieved steering ratio. The method also includes, in response to a determination that the difference between the commanded steering ratio and the achieved steering ratio is not greater than the threshold, selectively adjusting a bandwidth of a filter based on at least one vehicle characteristic of an associated vehicle and adjusting, using the filter, the commanded steering ratio to be equal to a desired steering ratio.

Another aspect of the disclosed embodiments includes a system. The system includes a processor and a memory. The memory includes instructions that, when executed by the processor, cause the processor to: determine a difference between a commanded steering ratio and an achieved steering ratio; determine whether the difference between the commanded steering ratio and the achieved steering ratio is greater than a threshold; in response to a determination that the difference between the commanded steering ratio and the achieved steering ratio is greater than the threshold, adjust the commanded steering ratio to be equal to the achieved steering ratio; and in response to a determination that the difference between the commanded steering ratio and the achieved steering ratio is not greater than the threshold: determine whether a handwheel position indicates that a handwheel of a vehicle is in a center position; in response to a determination that the handwheel position indicates that the handwheel of the vehicle is in the center position, selectively increase a bandwidth of a filter; and in response to a determination that the handwheel position indicates that the handwheel of the vehicle is not in the center position, selectively decrease the bandwidth of the filter and adjust, using the filter, the commanded steering ratio to be equal to a desired steering ratio.

These and other advantages and features will become more apparent from the following description taken in conjunction with the drawings.

DETAILED DESCRIPTION

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings.

As described, an electric power steering (EPS) typically includes components such as steering wheel (e.g., or handwheel), column, rack-pinion gear, electric motor actuator, and the like. The EPS assists the driver to steer a vehicle by providing an assist torque. The assist torque is based on a torque applied by the driver (applied torque). In a steady-state sense, the applied torque and assist torque counter the rack force generated due to interaction between tires of the vehicle and the road.

A typical Steer by wire (SbW) system includes a roadwheel actuator (RWA) unit and handwheel (or steering wheel) actuator (HWA) unit. The RWA unit and the HWA unit in the SbW are mechanically disconnected and communicate through controlled area network (CAN) interface (or other similar digital communication protocols). The HWA unit receives a rack force signal from the RWA unit to generate an appropriate torque feel for the driver. Alternatively, the handwheel angle and vehicle speed can also be used to generate desired torque feel to the driver. The angle from HWA unit is sent to the RWA unit, which controls rack travel.

In some SbW systems, a desired steering ratio may not be maintained at all times during operation of the vehicle. This may occur, for example, in response to exceeding a slew rate capability of the roadwheel actuator during a period of rapid driver input, in response to a handwheel angle input requiring roadwheel actuation beyond a travel stop, in response to an excess load on the roadwheel actuator, and in response to initialization issues.

Typically, if the SbW system does not achieve the desired steering ratio, the vehicle may experience a number of undesirable effects. For example, a typical algorithm performed by a controller of the SbW system may continue attempting to achieve the desired steering ratio after the driver ceases to actuate the steering wheel. This may cause a significant lag in the vehicle response and can appear to the driver that the vehicle has continued to steer autonomously (e.g., without driver input).

Accordingly, systems and methods, such as those described herein, configured to synchronize steering ratios of a SbW system, may be desirable. The systems and methods described herein may be configured to detect a loss of synchronization as it occurs and after a given level of error, adjust the commanded steering ratio to be equal to the achieved steering ratio. The systems and methods described herein may be configured to adjust the commanded steering ratio relatively rapidly, such that the commanded steering ratio is not significantly different, at any given time, than the achieved steering ratio, but not so rapidly as to respond to noise conditions.

In some embodiments, the systems and methods described herein may be configured to adjust the commanded steering ratio, using a nonlinear filter, such that the commanded steering ratio is equal to the desired steering ratio. The systems and methods described herein may be configured to adjust a bandwidth of the non-linear filter, such that a rate of change of the commanded steering ratio is controlled in order to minimize perception by the driver.

In some embodiments, the bandwidth of the filter can be a function of several variables, such as handwheel position, vehicle speed, throttle position, other suitable variables, or a combination thereof. The systems and methods described herein may be configured to increase the bandwidth of the filter when the vehicle is more "static" and less "active." For example, regardless of vehicle speed or throttle position, if the handwheel position indicates that the handwheel is on center, the vehicle is relatively "static" and a change of ratio would have theoretically no impact on vehicle trajectory. The systems and methods described herein may be configured to increase the bandwidth to a relatively high value in response to the handwheel position indicating the handwheel is on center.

Conversely, if handwheel position indicates the handwheel is at an angle relative to the center, a relatively small change in ratio may affect the vehicle trajectory. The systems and methods described herein may be configured to decrease the bandwidth in response to the handwheel position indicating the handwheel is at an angle relative to the center. The systems and methods described herein may be configured to further decrease the bandwidth in response to a high vehicle speed or high throttle position, which may increase the sensitivity and the response.

In some embodiments, the systems and methods described herein may be configured to determine a difference between a commanded steering ratio and an achieved steering ratio. The systems and methods described herein may be configured to determine whether the difference between the commanded steering ratio and the achieved steering ratio is greater than a threshold. The systems and methods described herein may be configured to, in response to a determination that the difference between the commanded steering ratio and the achieved steering ratio is greater than the threshold, adjust the commanded steering ratio to be equal to the achieved steering ratio.

In some embodiments, the systems and methods described herein may be configured to, in response to a determination that the difference between the commanded steering ratio and the achieved steering ratio is not greater than the threshold, selectively adjust a bandwidth of a filter based one at least one vehicle characteristic of an associated vehicle. In some embodiments, filter includes a non-linear filter, such as a first order digital filter. In some embodiments, the at least one vehicle characteristic includes a roadwheel angle of a roadwheel of the vehicle. In some embodiments, the at least one vehicle characteristic includes a vehicle speed of the vehicle. In some embodiments, the at least one vehicle characteristic includes a throttle position of a throttle of the vehicle. In some embodiments, the at least one vehicle characteristic includes a handwheel position of a handwheel of the vehicle.

In some embodiments, the systems and methods described herein may be configured to adjust, using the filter, the commanded steering ratio to be equal to a desired steering ratio. The systems and methods described herein may be configured to selectively adjust the bandwidth of the filter by increasing the bandwidth in response to a determination that the handwheel position indicates that the handwheel is in a center position. The systems and methods described herein may be configured to selectively adjust the bandwidth of the filter by decreasing the bandwidth in response to a determination that the handwheel position indicates that the handwheel is at an angle relative to a center position.

Figure 1:
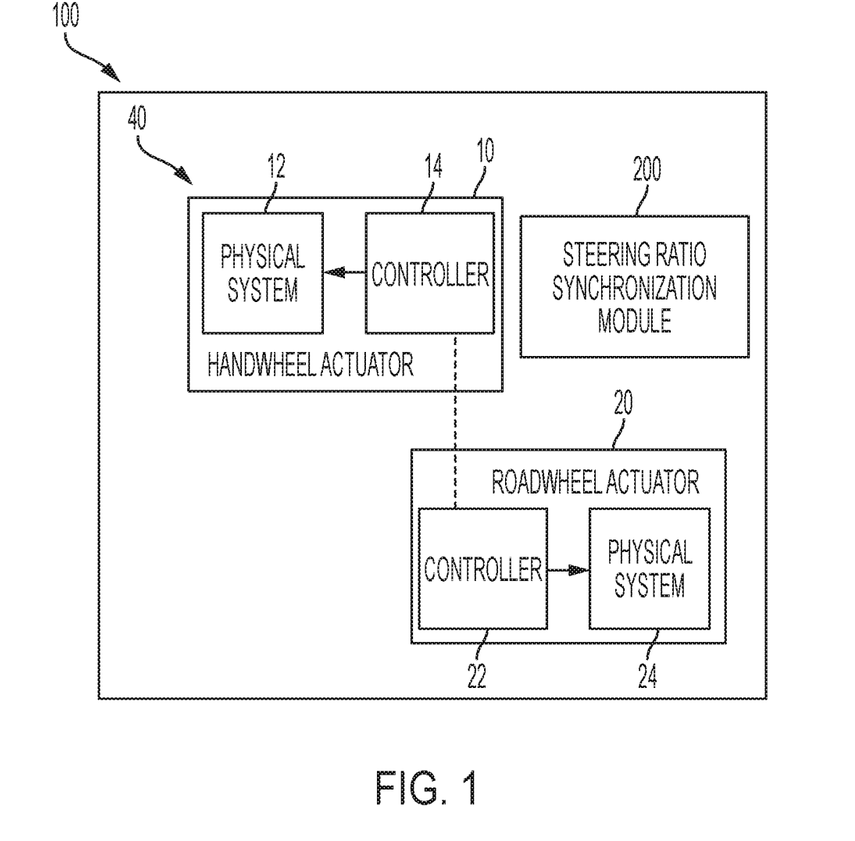
FIG. 1 generally illustrates a steer by wire steering system according to the principles of the present disclosure.

FIG. 1 generally illustrates a steer by wire steering (SbW) system 40 of a vehicle 100. It will be appreciated that the SbW system 40 shown and described can be used in an autonomous or semi-autonomous vehicle or in a more conventional vehicle. Additionally, or alternatively, the vehicle 100 may include any suitable vehicle including, but not limited to, a car, a truck, an agricultural vehicle, a marine vessel, an airplane, a helicopter, or any other suitable vehicle. The SbW system 40 includes a handwheel actuator (HWA) 10 and a roadwheel actuator (RWA) 20.

The HWA 10 includes one or more mechanical components 12, such as a handwheel (steering wheel), a steering column, a motor/inverter, attached to the steering column through either a gear mechanism or a direct drive system. The HWA 10 further includes a microcontroller 14 that controls the operation of the mechanical components 12. The microcontroller 14 receives and/or generates torque via the one or more mechanical components 12.

The RWA includes one or more mechanical components 24, such as a steering rack and/or pinion coupled to a motor/inverter through a ball-nut/ball-screw (gear) arrangement, and the rack is connected to the vehicle roadwheels (e.g., tires) through tie-rods. The RWA 20 includes a microcontroller 22 that controls the operation of the mechanical components 24. The microcontroller 22 receives and/or generates torque via the one or more mechanical components 24.

The microcontrollers 12 and 22 are coupled through electrical connections that allow signals to be transmitted and/or received. As referred to herein, a controller can include a combination of the HWA controller 12 and the RWA controller 22, or any one of the specific microcontrollers.

In one or more examples, the controllers 12 and 22 of SbW system 40 communicate with each other through CAN interface (or other similar digital communication protocols). Guidance of the vehicle 100 that is fitted with the SbW system 40 is performed by use of the steering gear, with an input shaft that is rotated by the RWA 20, such as a servo actuator.

The RWA 20 receives an electronic communication signal of rotation of the steering wheel by the driver. A driver controls the steering wheel to directionally control the vehicle 100. The angle from HWA 10 is sent to the RWA 20, which performs position control in order to control rack travel to guide the roadwheel. However, due to the lack of mechanical connection between the steering wheel and the road wheels, the driver is not provided with a feel for the road without torque feedback (unlike the case in an EPS as described).

In some embodiments, the HWA 10, which is coupled to the steering column and steering wheel, simulates the feel of the road as experienced by the driver. The HWA 10 may apply tactile feedback in the form of torque to the steering wheel. The HWA 10 receives a rack force signal from the RWA 20 to generate an appropriate torque feel for the driver. Alternatively, the handwheel angle and vehicle speed can also be used to generate desired torque feel to the driver.

The HWA 10 and the RWA 20 typically have a steering ratio that determines how much the roadwheel changes position when a corresponding change in position is made in the handwheel of the SbW system 40. In a steering system that has a mechanical linkage between the handwheel and the roadwheel, a gear maintains this ratio. In the SbW system 40, the steering ratio is a predetermined value. However, in the SbW system 40, the desired steering ratio may not be maintained at all times. There are several common situations that might cause this to occur. Examples include exceeding the slew rate capability of the RWA 20 during a rapid driver input, handwheel angle input requiring roadwheel actuation past a travel stop, excess load on the RWA 20 (above a predetermined maximum threshold), initialization issues, and the like.

The SbW system 40 may include a steering ratio synchronization module 200 configured to, at least, adjust a commanded steering ratio. The commanded steering ratio may include a value of the steering ratio that is set (e.g., a command sent to the EPS) to adjust the steering ratio. Based on a maneuver being performed by the driver the SbW system 40 attempts to position the roadwheel according to the handwheel position using the commanded steering ratio. However, the roadwheel may be limited because of the roadwheel being stuck, for example against a sidewalk, in a muddy surface, or any other such reason. Accordingly, the achieved steering ratio, which is an actual steering ratio between the handwheel position and the actual position of the roadwheel, may be different from the commanded steering ratio. Further, desired steering ratio may represent a ratio between the handwheel position and a position of the roadwheel that is desired by the driver. It should be noted that while FIG. 1 generally illustrates the steering ratio synchronization module 200 as a separate block, the steering ratio synchronization module 200 may be part of the controllers 14/22 of the HWA 10 and/or RWA 20.

Figure 4:
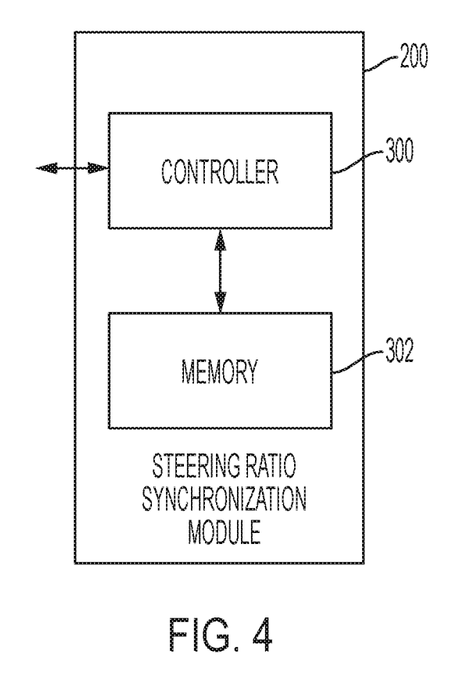
FIG. 4 generally illustrates a steering ratio synchronization module according to the principles of the present disclosure.

The steering ratio synchronization module 200 may include one or more electronic circuits. As is generally illustrated in FIG. 4, the steering ratio synchronization module 200 may include a controller 300 and a memory 302. The controller 300 may include a processor. The processor may include any suitable processor, such as those described herein. Additionally, or alternatively, the controller 300 may include any suitable number of processors. The memory 302 may comprise a single disk or a plurality of disks (e.g., hard drives), and includes a storage management module that manages one or more partitions within the memory 302. In some embodiments, memory 302 may include flash memory, semiconductor (solid state) memory or the like. The memory 302 may include Random Access Memory (RAM), a Read-Only Memory (ROM), or a combination thereof. The memory 302 may include instructions that, when executed by the controller 300, cause the controller 300, at least, to perform the functions described here.

Figure 3:
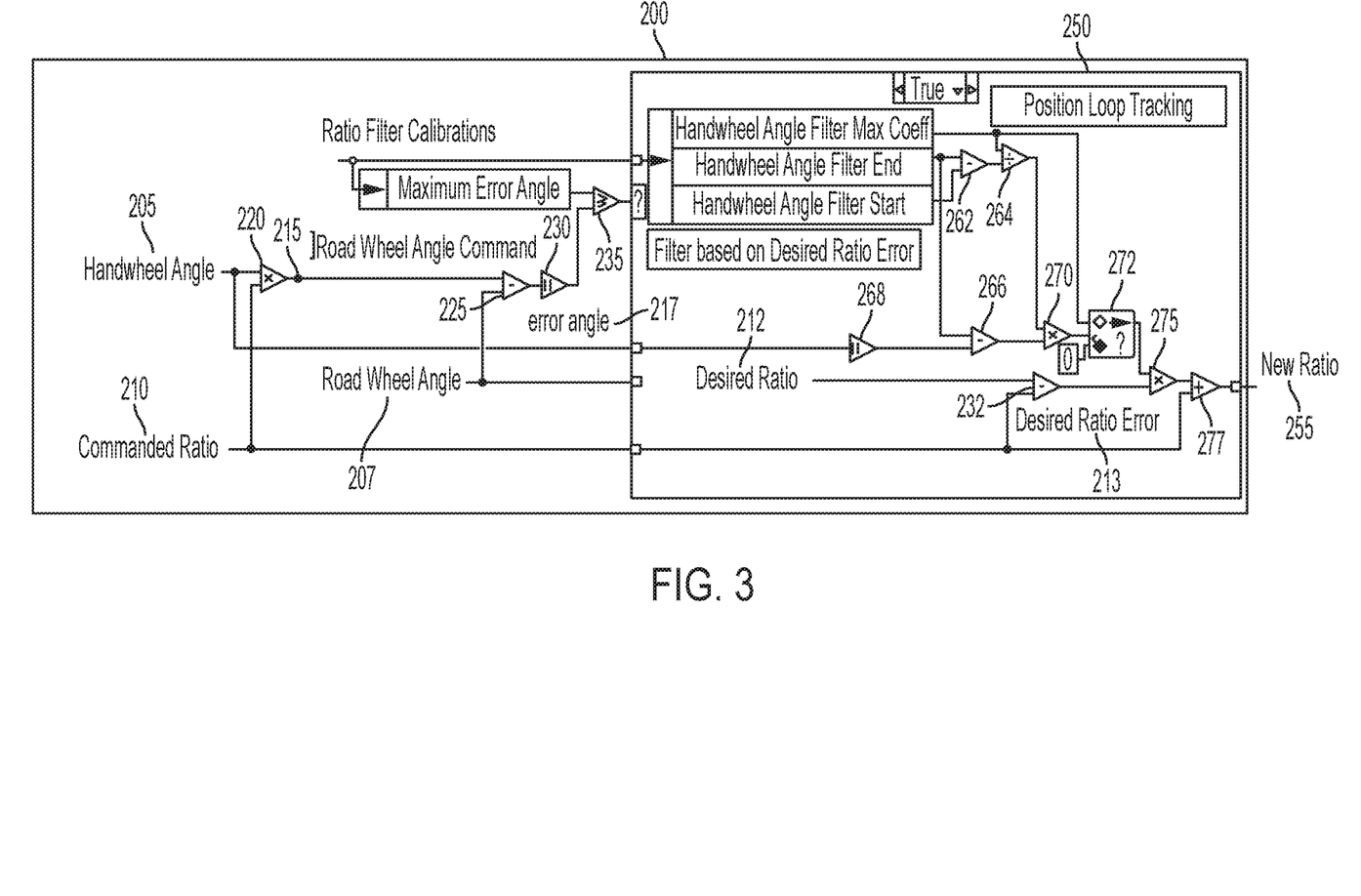
FIG. 3 generally illustrates a continuation of the flow diagram of the steering ratio synchronization according to the principles of the present disclosure.

In some embodiments, the steering ratio synchronization module 200 may be configured to determine a difference between a commanded steering ratio and an achieved steering ratio of the SbW system 40. For example, as is generally illustrated in FIG. 3, the steering ratio synchronization module 200 receives one or more steering signals including a handwheel angle 205, a roadwheel angle 207, and a commanded steering ratio 210. It should be understood that the steering ratio synchronization module 200 may receive any suitable signals indicating any suitable measurements other than those described herein.

The steering ratio synchronization module 200 may determine a roadwheel angle command 215 by multiplying (220) the commanded steering ratio 210 by the handwheel angle. The steering ratio synchronization module 200 may determine an error angle 217 by determining the difference between the roadwheel angle command 215 and the roadwheel angle 207. In some embodiments, an absolute value of the error angle 217 is determined (230).

Figure 2:
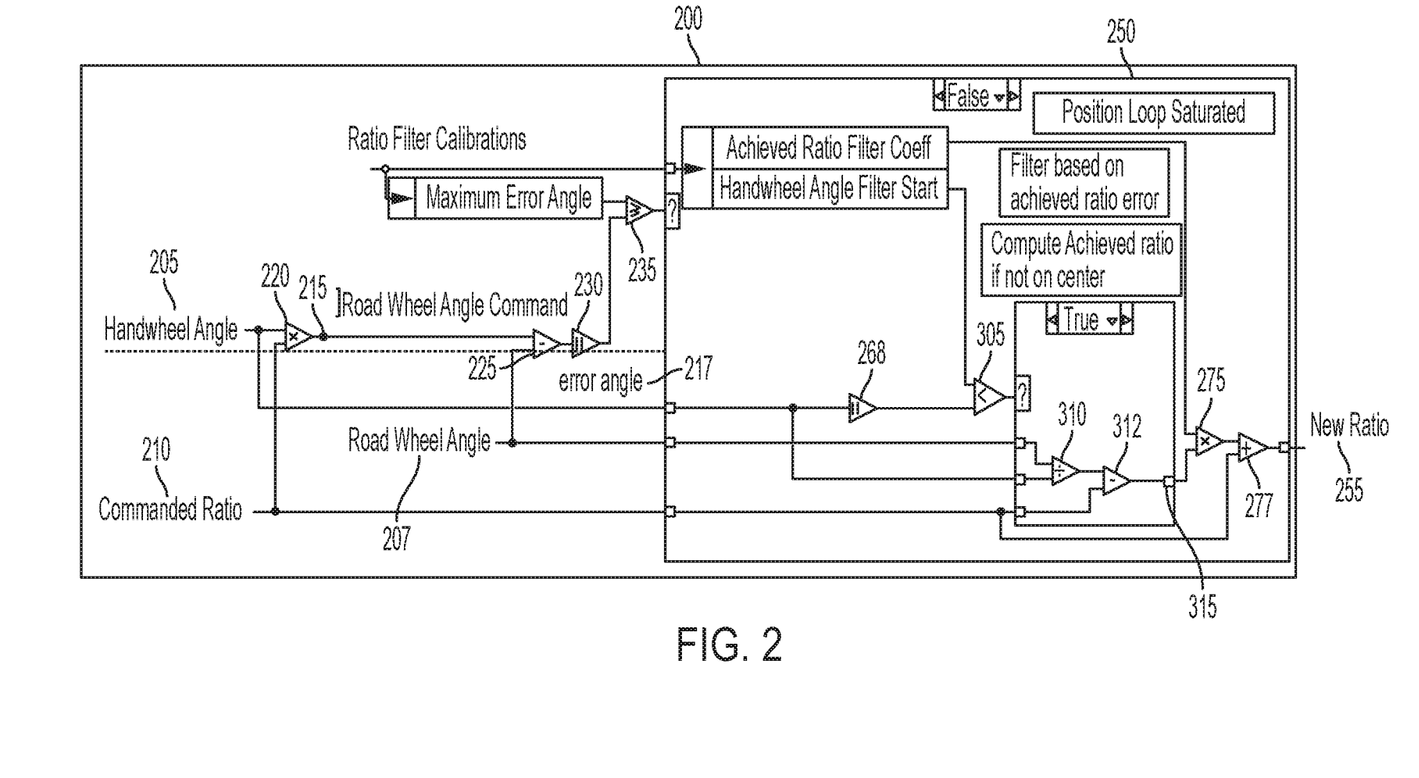
FIG. 2 is a flow diagram generally illustrating a steering ratio synchronization according to the principles of the present disclosure.

In some embodiments, as is generally illustrated in FIG. 2, the steering ratio synchronization module 200 may determine whether the difference between the commanded steering ratio and the achieved steering ratio is greater than a predetermined threshold (e.g., predetermined maximum error angle value or other suitable vale). The steering ratio synchronization module 200 may be configured to, in response to a determination that the difference between the commanded steering ratio and the achieved steering ratio is greater than the predetermined threshold, adjust the commanded steering ratio to be equal to the achieved steering ratio.

The steering ratio 255 is illustrated where the roadwheel error angle 217 exceeds (or is equal to) the predetermined threshold (e.g., the position closed-loop is saturated). As is generally illustrated, the achieved steering ratio (new ratio 255) is not equal to the commanded steering ratio 210, and the handwheel angle does not correspond (not in synchronization) with the roadwheel angle. The steering ratio synchronization module 200 may adjust the commanded steering ratio 210 towards the achieved steering ratio 225.

In some embodiments, the steering ratio synchronization module 200 may compare (305) the absolute value of the handwheel angle (268) with the handwheel filter-start. If the steering ratio synchronization module 200 determines that the handwheel angle value is less than the filter-start value, the steering ratio synchronization module 200 determines that the achieved steering ratio is not on center. The steering ratio synchronization module 200 may us a predetermined value of an achieved-ratio filter-coefficient as the gain factor (275). Additionally, or alternatively, the steering ratio synchronization module 200 may compute the achieved steering angle by dividing (310) the roadwheel angle 207 by the handwheel angle 205.

In some embodiments, the steering ratio synchronization module 200 may subtract (312) the commanded steering ratio 210 from the calculated achieved steering ratio. The steering ratio synchronization module 200 may multiply the difference (315) by the gain factor (275). The steering ratio synchronization module 200 may generate the new steering ratio 255 by adding (277) the result (e.g., the product of the difference (315) and the gain factor (275)) into the present commanded steering ratio 210. In this manner, the steering ratio synchronization module 200 adjusts the commanded steering ratio 210 to the achieved steering ratio value (e.g., the command itself is changed based on what the SbW system 40 can achieve and/or has achieved).

In some embodiments, the steering ratio synchronization module 200 may determine whether the achieved steering ratio is on center based on a handwheel position of the handwheel of the vehicle 100. If the steering ratio synchronization module 200 determines that the achieved steering ratio is on the center, based on the handwheel angle value being greater than (or equal to) the filter-start value (305), the steering ratio synchronization module 200 does not compute the difference (315) between the achieved steering ratio and the commanded steering ratio (210).

The steering ratio synchronization module 200 sets the difference (315) to zero (0). Accordingly, the result of the multiplication between the difference (315) and the gain factor (275) is zero, which when added (277) into the commanded steering ratio (210) does not change the present steering ratio value (e.g., which sets the new steering ratio (255) to the present value). The steering ratio synchronization module 200 computes the gain factor by filtering the handwheel angle (205) based on the achieved steering ratio (315).

Conversely, if the steering ratio synchronization module 200 determines that the achieved steering ratio is not on center, the steering ratio synchronization module 200 detects the loss of synchronization between the achieved steering ratio and commanded steering ratio 210 as it occurs. The steering ratio synchronization module 200 may determine if the difference between the achieved steering ratio and the commanded steering ratio 210 is greater than the predetermined threshold. The steering ratio synchronization module 200 may adjust the commanded steering ratio 210 to be equal to the achieved steering ratio, in response to the difference being greater than the predetermined threshold. This adjustment may occur relatively rapidly, such that the commanded steering ratio 210 is substantially equal to the achieved steering ratio, but not so rapidly to respond to noise conditions.

The steering ratio synchronization module 200 uses a ratio calculator module 250 that performs a non-linear filtering to adjust the commanded steering ratio 210 to be equal to the achieved steering ratio. The non-linear filtering of the commanded steering ratio 210 is performed by the subtraction unit 232, the multiplier 275, and the addition unit 277. The steering ratio synchronization module 200 may adjust the bandwidth of the nonlinear filtering of the ratio calculator module 250, such that the rate of change of the commanded steering ratio 210 is controlled to minimize disturbance to or perception by the driver.

In some embodiments, the steering ratio synchronization module 200 may selectively adjust the bandwidth of the filter based on the at least one vehicle characteristic of the vehicle 100, as described. The steering ratio synchronization module 200 may increase the bandwidth of the filter in response to the vehicle 100 being more "static" and less "active." For example, regardless of vehicle speed or throttle position, if the steering ratio synchronization module 200 determines that the handwheel angle (205) (e.g., using the handwheel position) is on center (e.g., the vehicle 100 is relatively "static" and a change of the steering ratio can have relatively little impact on the vehicle trajectory) the steering ratio synchronization module 200 may increase the bandwidth to a relatively high value.

Conversely, if the steering ratio synchronization module 200 determines that the handwheel angle (205) (e.g., using the handwheel position) is greater than a predetermined value (e.g., the handwheel angle is not on center and a relatively small change in the steering ratio can affect the vehicle trajectory, the steering ratio synchronization module 200 may decrease the bandwidth of the filter. Additionally, or alternatively, the steering ratio synchronization module 200 may determine whether the vehicle speed of the vehicle 100 is above a threshold and/or the throttle position of a throttle of the vehicle 100 is above a threshold. If the steering ratio synchronization module 200 determines that at least one of the vehicle speed of the vehicle 100 is above a threshold and/or the throttle position of a throttle of the vehicle 100 is above a threshold, the steering ratio synchronization module 200 further decreases the bandwidth of the filter.

In some embodiments, as is generally illustrated n FIG. 3, if the steering ratio synchronization module 200 determines that the error angle, when compared (235) with the predetermined threshold, is less than the predetermined threshold (e.g. maximum error angle), a ratio calculator module 250 computes a new steering ratio 255 using the one or more steering system signals. In some embodiments, the steering ratio synchronization module 200 may be configured to, in response to a determination that the error angle, when compared (235) with the predetermined threshold is less than the predetermined threshold, selectively adjust a bandwidth of a filter based on at least one vehicle characteristic of an associated vehicle. The filter may a non-linear filter, such as a first order digital filter, or any suitable filter. The at least one vehicle characteristic may include a roadwheel angle of a roadwheel of the vehicle 100, a vehicle speed of the vehicle 100, a throttle position of a throttle of the vehicle 100, a handwheel position of the handwheel of the vehicle 100, any other suitable vehicle characteristic, or a combination thereof.

The ratio calculator 250 may compute a desired steering ratio error 213, by determining a difference (232) between a desired steering ratio 212 and the commanded steering ratio 210. The desired steering ratio 212 may include a predetermined value or may include a scaling factor computed by filtering the handwheel angle 205 using a filter-start, a filter-end, and a max-filter coefficient. The filter-start and filter-end values may include handwheel position values at the start and end of a steering wheel maneuver. The max-filter coefficient may include a predetermined value that may be calibratable.

In some embodiments, the steering ratio synchronization module 200 divide (264) a difference (262) between the filter-end and filter-start by the max-filter coefficient to generate a first scaling factor. The steering ratio synchronization module 200 may generate an adjusted first scaling factor by multiplying (270) the first scaling factor with a difference (266) between the filter-end and an absolute value (268) of the present handwheel angle 205. The steering ratio synchronization module 200 may further limit the adjusted first scaling factor in a predetermined range (272), for example between 0 and the max-filter coefficient, and the result is provided as the scaling factor, or gain factor to generate the new steering ratio 255.

In some embodiments, the steering ratio synchronization module 200 may multiply (275) the gain factor by the desired steering ratio error 213. The steering ratio synchronization module 200 may add (277) the result into the present commanded steering ratio 210 to generate the new steering ratio 255. The steering ratio synchronization module 200 may compute the gain factor used to multiply (275) the desired steering ratio error (213) by filtering the handwheel angle (205) based on the desired steering ratio error (213). As is generally illustrated, the error angle 217 of the roadwheel is less than the predetermined threshold (235), the achieved steering ratio (new ratio 255) is substantially equal to the commanded steering ratio 210, and the roadwheel angle corresponds to the handwheel angle. The steering ratio synchronization module 200 may not adjust the commanded steering ratio, in response to the achieved steering ratio (new ratio 255) being substantially equal to the commanded steering ratio.

In some embodiments, the steering ratio synchronization module 200 and/or the controller 300 may perform the methods described herein. However, the methods described herein as performed by the steering ratio synchronization module 200 and/or the controller 300 are not meant to be limiting, and any type of software executed on a controller can perform the methods described herein without departing from the scope of this disclosure. For example, a controller, such as a processor executing software within a computing device, can perform the methods described herein.

Figure 5:
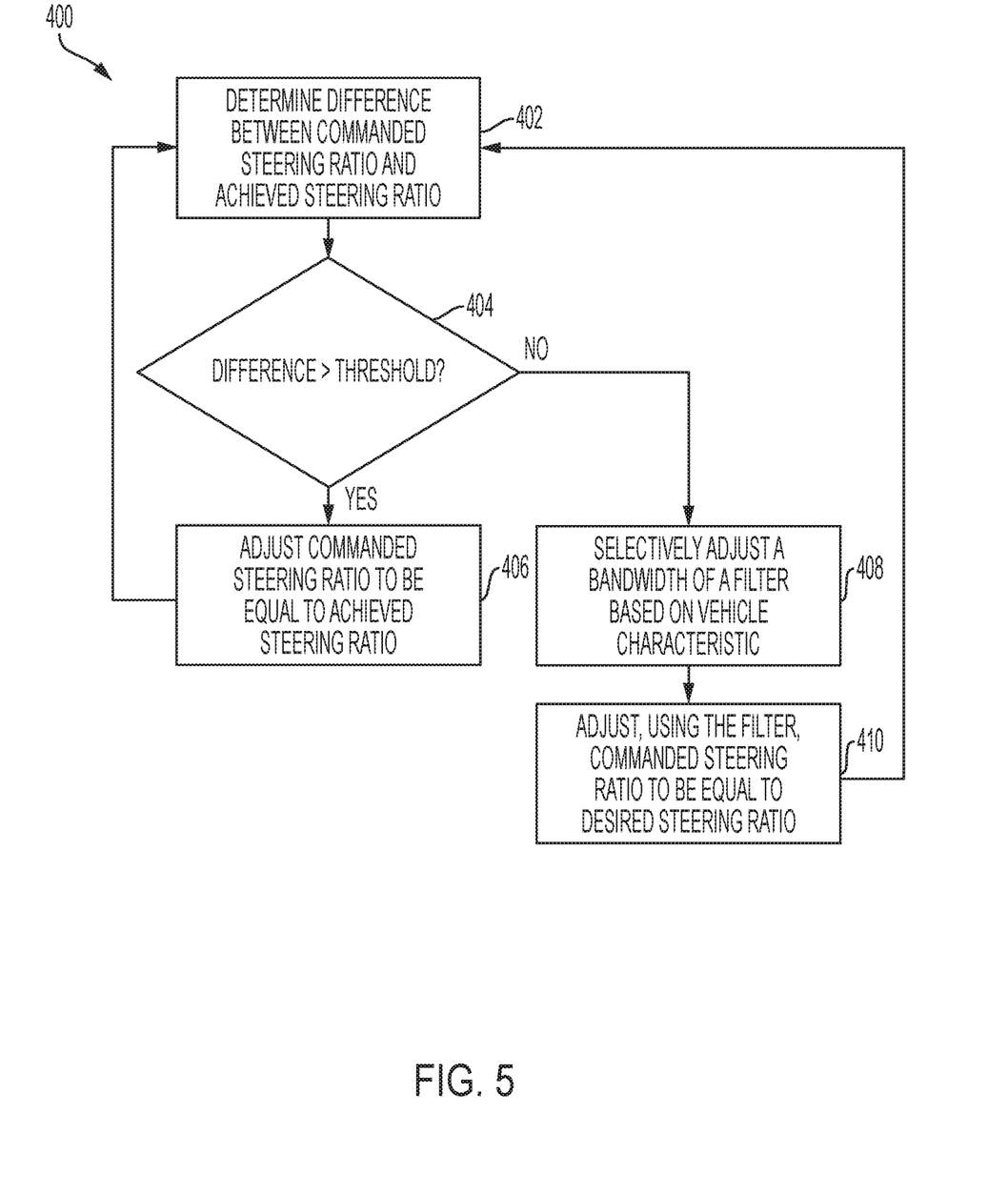
FIG. 5 is a flow diagram generally illustrating a steering ratio synchronization method according to the principles of the present disclosure.

FIG. 5 is a flow diagram generally illustrating a steering ratio synchronization method 400 according to the principles of the present disclosure. At 402, the method 400 determines a difference between a commanded steering ratio and an achieved steering ratio. For example, the controller 300 determines the difference between the commanded steering ratio and the achieved steering ratio.

At 404, the method 400 determines whether the difference is greater than a threshold. For example, the controller 300 determines whether the difference between the commanded steering ratio and the achieved steering ratio is greater than the predetermined threshold. If the controller 300 determines that the difference is less than the predetermined threshold, the method 400 continues at 408. If the controller 300 determines that the difference is greater than the predetermined threshold, the method 400 continues at 406.

At 406, the method 400 adjusts the commanded steering ratio to be equal to the achieved steering ratio. For example, the controller 300 adjusts the commanded steering ratio to be equal to the achieved steering ratio. The method 400 may continue at 402 or the method 400 may end. Additionally, or alternatively, the method 400 may include performing additional operations before continuing at 402 or before ending.

At 408, the method 400 selectively adjusts a bandwidth of a filter based on at least one vehicle characteristic. For example, the controller 300 adjusts the bandwidth of the filter based on the at least one vehicle characteristic. As described, the controller 300 may increase the bandwidth of the filter in response to the handwheel position indicating that a handwheel angle of the handwheel of the vehicle 100 is on center. Conversely, the controller 300 may reduce the bandwidth of the filter in response to the handwheel position indicating that a handwheel angle of the handwheel of the vehicle 100 is not on center. Additionally, or alternatively, the controller 300 may further decrease the bandwidth of the filter based on a vehicle speed of the vehicle 100 and/or a throttle position of the throttle of the vehicle 100.

At 410, the method 400 adjusts, using the filter, the commanded steering ratio to be equal to a desired steering ratio. For example, the controller 300 uses the filter to adjust the commanded steering ratio to be equal to the desired steering ratio. The method 400 may continue at 402 or the method 400 may end. Additionally, or alternatively, the method 400 may include performing additional operations before continuing at 402 or before ending.

The technical solutions described herein accordingly facilitate a SbW system to dynamically adjust the steering ratio between the HWA and the RWA, and further adjust the rate of adjusting the steering ratio based on a handwheel angle. The rate of adjusting can be further adjusted based on other parameters such as vehicle speed, throttle position, and the like. The technical solutions improve the operation of the steering system by preventing the steering system from continuing to try to achieve a desired steering ratio (predetermined value) after the driver ceases to actuate the handwheel. If the steering system is not prevented, it can cause a lag in the vehicle response and can make it appear that the vehicle has continued to steer on its own.

In some embodiments, a steer by wire steering system includes a processor and a memory. The memory includes instructions that, when executed by the processor, cause the processor to: determine a difference between a commanded steering ratio and an achieved steering ratio; determine whether the difference between the commanded steering ratio and the achieved steering ratio is greater than a threshold; in response to a determination that the difference between the commanded steering ratio and the achieved steering ratio is greater than the threshold, adjust the commanded steering ratio to be equal to the achieved steering ratio; in response to a determination that the difference between the commanded steering ratio and the achieved steering ratio is greater than the threshold: selectively adjust a bandwidth of a filter based on at least one vehicle characteristic of an associated vehicle; and adjust, using the filter, the commanded steering ratio to be equal to a desired steering ratio.

In some embodiments, the at least one vehicle characteristic includes a roadwheel angle of a roadwheel of the vehicle. In some embodiments, the at least one vehicle characteristic includes a vehicle speed of the vehicle. In some embodiments, the at least one vehicle characteristic includes a throttle position of a throttle of the vehicle. In some embodiments, the at least one vehicle characteristic includes a handwheel position of a handwheel of the vehicle. In some embodiments, the instructions further cause the processor to selectively adjust the bandwidth of the filter by increasing the bandwidth in response to a determination that the handwheel position indicates that the handwheel is in a center position. In some embodiments, the instructions further cause the processor to selectively adjust the bandwidth of the filter by decreasing the bandwidth in response to a determination that the handwheel position indicates that the handwheel is at an angle relative to a center position. In some embodiments, filter includes a non-linear filter.

In some embodiments, a method for a steer by wire steering system includes determining a difference between a commanded steering ratio and an achieved steering ratio and determining whether the difference between the commanded steering ratio and the achieved steering ratio is greater than a threshold. The method also includes, in response to a determination that the difference between the commanded steering ratio and the achieved steering ratio is greater than the threshold, adjusting the commanded steering ratio to be equal to the achieved steering ratio. The method also includes, in response to a determination that the difference between the commanded steering ratio and the achieved steering ratio is not greater than the threshold, selectively adjusting a bandwidth of a filter based on at least one vehicle characteristic of an associated vehicle and adjusting, using the filter, the commanded steering ratio to be equal to a desired steering ratio.

In some embodiments, the at least one vehicle characteristic includes a roadwheel angle of a roadwheel of the vehicle. In some embodiments, the at least one vehicle characteristic includes a vehicle speed of the vehicle. In some embodiments, the at least one vehicle characteristic includes a throttle position of a throttle of the vehicle. In some embodiments, the at least one vehicle characteristic includes a handwheel position of a handwheel of the vehicle. In some embodiments, the method also includes selectively adjusting the bandwidth of the filter by increasing the bandwidth in response to a determination that the handwheel position indicates that the handwheel is in a center position. In some embodiments, the method also includes selectively adjusting the bandwidth of the filter by decreasing the bandwidth in response to a determination that the handwheel position indicates that the handwheel is at an angle relative to a center position. In some embodiments, filter includes a non-linear filter.

In some embodiments, a system includes a processor and a memory. The memory includes instructions that, when executed by the processor, cause the processor to: determine a difference between a commanded steering ratio and an achieved steering ratio; determine whether the difference between the commanded steering ratio and the achieved steering ratio is greater than a threshold; in response to a determination that the difference between the commanded steering ratio and the achieved steering ratio is greater than the threshold, adjust the commanded steering ratio to be equal to the achieved steering ratio; and in response to a determination that the difference between the commanded steering ratio and the achieved steering ratio is not greater than the threshold: determine whether a handwheel position indicates that a handwheel of a vehicle is in a center position; in response to a determination that the handwheel position indicates that the handwheel of the vehicle is in the center position, selectively increase a bandwidth of a filter; in response to a determination that the handwheel position indicates that the handwheel of the vehicle is not in the center position, selectively decrease the bandwidth of the filter and adjust, using the filter, the commanded steering ratio to be equal to a desired steering ratio.

In some embodiments, the instructions further cause the processor to, in response to decreasing the bandwidth of the filter, determine at least one of a vehicle speed of the vehicle and a throttle position of a throttle of the vehicle. In some embodiments, the instructions further cause the processor to further decrease the bandwidth of the filter based on the at least one the vehicle speed of the vehicle and the throttle position of a throttle of the vehicle. In some embodiments, filter includes a non-linear filter.

In some embodiments, steer by wire steering system includes a handwheel actuator, a roadwheel actuator, and a steering ratio synchronization module. The steering ratio synchronization module is to dynamically adjust a steering ratio between the roadwheel actuator and the handwheel actuator, the dynamic adjustment comprising: detecting a predetermined error threshold being exceeded by a difference between a commanded steering ratio and an achieved steering ratio; computing a gain factor using a handwheel angle; computing an adjustment factor by multiplying the gain factor with a difference in the commanded steering ratio and a desired steering ratio value; and computing an adjusted steering ratio by changing the commanded steering ratio by adding the adjustment factor to the commanded steering ratio.

In some embodiments, computing the gain factor comprises: determining an error angle by computing a difference between a roadwheel angle and a multiplication result of the handwheel angle and the commanded steering ratio. In some embodiments, computing the gain factor further comprises: determining that the error angle is greater than or equal to a predetermined maximum error angle; in response, computing a first scaling factor using a filter-end value and a filter-start value; computing a difference between a filter-end value and the handwheel angle; and computing a multiplication of the first scaling factor and the difference as the gain factor. In some embodiments, the gain factor is normalized within a predetermined range. In some embodiments, computing the gain factor further comprises determining that the error angle is less than the predetermined maximum error angle and, in response, computing the gain factor based on an achieved steering ratio. In some embodiments, computing the gain factor further comprises computing the achieved steering ratio if the handwheel angle is less than the filter-start value, and computing the adjustment factor by multiplying the gain factor with a difference between the achieved steering ratio and the commanded steering ratio. In some embodiments, if the handwheel angle is not less than the filter-start value, setting the achieved steering ratio to zero.

In some embodiments, a method for adjusting a steering ratio in a steer by wire steering system includes detecting a predetermined error threshold being exceeded by a difference between a commanded steering ratio and an achieved steering ratio and computing a gain factor using a handwheel angle. The method also includes computing an adjustment factor by multiplying the gain factor with a difference in the commanded steering ratio and a desired steering ratio value and computing an adjusted steering ratio by changing the commanded steering ratio by adding the adjustment factor to the commanded steering ratio.

In some embodiments, computing the gain factor comprises: determining an error angle by computing a difference between a roadwheel angle and a multiplication result of the handwheel angle and the commanded steering ratio. In some embodiments, computing the gain factor further comprises: determining that the error angle is greater than or equal to a predetermined maximum error angle; in response, computing a first scaling factor using a filter-end value and a filter-start value; computing a difference between a filter-end value and the handwheel angle; and computing a multiplication of the first scaling factor and the difference as the gain factor. In some embodiments, the gain factor is normalized within a predetermined range. In some embodiments, computing the gain factor further comprises determining that the error angle is less than the predetermined maximum error angle and, in response, computing the gain factor based on an achieved steering ratio. In some embodiments, computing the gain factor further comprises computing the achieved steering ratio if the handwheel angle is less than the filter-start value and computing the adjustment factor by multiplying the gain factor with a difference between the achieved steering ratio and the commanded steering ratio. In some embodiments, if the handwheel angle is not less than the filter-start value, setting the achieved steering ratio to zero.

In some embodiments, a computer program product includes a memory storage device having computer executable instructions stored therein. The computer executable instructions, when executed by a processing unit, cause the processing unit to perform adjusting of a steering ratio in a steer by wire steering system. The adjusting includes: detecting a predetermined error threshold being exceeded by a difference between a commanded steering ratio and an achieved steering ratio; computing a gain factor using a handwheel angle; computing an adjustment factor by multiplying the gain factor with a difference in the commanded steering ratio and a desired steering ratio value; and computing an adjusted steering ratio by changing the commanded steering ratio by adding the adjustment factor to the commanded steering ratio.

In some embodiments, computing the gain factor comprises determining an error angle by computing a difference between a roadwheel angle and a multiplication result of the handwheel angle and the commanded steering ratio. In some embodiments, computing the gain factor further comprises: determining that the error angle is greater than or equal to a predetermined maximum error angle; in response, computing a first scaling factor using a filter-end value and a filter-start value; computing a difference between a filter-end value and the handwheel angle; and computing a multiplication of the first scaling factor and the difference as the gain factor. In some embodiments, the gain factor is normalized within a predetermined range. In some embodiments, computing the gain factor further comprises determining that the error angle is less than a predetermined maximum error angle and, in response, computing the gain factor based on an achieved steering ratio. In some embodiments, computing the gain factor further comprises: computing the achieved steering ratio if the handwheel angle is less than the filter-start value; computing the adjustment factor by multiplying the gain factor with a difference between the achieved steering ratio and the commanded steering ratio; and if the handwheel angle is not less than the filter-start value, setting the achieved steering ratio to zero.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A steer by wire steering system, comprising:
   a processor; and
   a memory including instructions that, when executed by the processor, cause the processor to:
      determine a difference between a commanded steering ratio and an achieved steering ratio;
      determine whether the difference between the commanded steering ratio and the achieved steering ratio is greater than a threshold;

in response to a determination that the difference between the commanded steering ratio and the achieved steering ratio is greater than the threshold, adjust the commanded steering ratio to be equal to the achieved steering ratio; and in response to a determination that the difference between the commanded steering ratio and the achieved steering ratio is not greater than the threshold:

selectively adjust a bandwidth of a non-linear filter based on at least one vehicle characteristic of an associated vehicle; and adjust, using the non-linear filter, the commanded steering ratio to be equal to a desired steering ratio, wherein the bandwidth is selectively adjusted to control a rate of change of the commanded steering ratio.

2. The steer by wire steering system of claim 1, wherein the at least one vehicle characteristic includes a roadwheel angle of a roadwheel of the vehicle.

3. The steer by wire steering system of claim 1, wherein the at least one vehicle characteristic includes a vehicle speed of the vehicle.

4. The steer by wire steering system of claim 1, wherein the at least one vehicle characteristic includes a throttle position of a throttle of the vehicle.

5. The steer by wire steering system of claim 1, wherein the at least one vehicle characteristic includes a handwheel position of a handwheel of the vehicle.

6. The steer by wire steering system of claim 5, wherein the instructions further cause the processor to selectively adjust the bandwidth of the non-linear filter by increasing the bandwidth in response to a determination that the handwheel position indicates that the handwheel is in a center position.

7. The steer by wire steering system of claim 5, wherein the instructions further cause the processor to selectively adjust the bandwidth of the non-linear filter by decreasing the bandwidth in response to a determination that the handwheel position indicates that the handwheel is at an angle relative to a center position.

8. The steer by wire steering system of claim 7, wherein non-linear filter includes a first order digital filter.

9. A method for a steer by wire steering system, the method comprising:

determining a difference between a commanded steering ratio and an achieved steering ratio;

determining whether the difference between the commanded steering ratio and the achieved steering ratio is greater than a threshold;

in response to a determination that the difference between the commanded steering ratio and the achieved steering ratio is greater than the threshold, adjusting the commanded steering ratio to be equal to the achieved steering ratio; and in response to a determination that the difference between the commanded steering ratio and the achieved steering ratio is not greater than the threshold;

selectively adjusting a bandwidth of a non-linear filter based one at least one vehicle characteristic of an associated vehicle; and adjusting, using the non-linear filter, the commanded steering ratio to be equal to a desired steering ratio, wherein the bandwidth is selectively adjusted to control a rate of change of the commanded steering ratio.

10. The method of claim 9, wherein the at least one vehicle characteristic includes a roadwheel angle of a roadwheel of the vehicle.

11. The method of claim 9, wherein the at least one vehicle characteristic includes a vehicle speed of the vehicle.

12. The method of claim 9, wherein the at least one vehicle characteristic includes a throttle position of a throttle of the vehicle.

13. The method of claim 9, wherein the at least one vehicle characteristic includes a handwheel position of a handwheel of the vehicle.

14. The method of claim 13, further comprising selectively adjusting the bandwidth of the non-linear filter by increasing the bandwidth in response to a determination that the handwheel position indicates that the handwheel is in a center position.

15. The method of claim 13, further comprising selectively adjusting the bandwidth of the non-linear filter by decreasing the bandwidth in response to a determination that the handwheel position indicates that the handwheel is at an angle relative to a center position.

16. The method of claim 15, wherein non-linear filter includes a first order digital filter.

17. A system comprising:
a processor; and
a memory including instructions that, when executed by the processor, cause the processor to:

determine a difference between a commanded steering ratio and an achieved steering ratio;

determine whether the difference between the commanded steering ratio and the achieved steering ratio is greater than a threshold;

in response to a determination that the difference between the commanded steering ratio and the achieved steering ratio is greater than the threshold, adjust the commanded steering ratio to be equal to the achieved steering ratio; and in response to a determination that the difference between the commanded steering ratio and the achieved steering ratio is not greater than the threshold:

determine whether a handwheel position indicates that a handwheel of a vehicle is in a center position;

in response to a determination that the handwheel position indicates that the handwheel of the vehicle is in the center position, selectively increase a bandwidth of a non-linear filter;

in response to a determination that the handwheel position indicates that the handwheel of the vehicle is not in the center position, selectively decrease the bandwidth of the non-linear filter; and adjust, using the non-linear filter, the commanded steering ratio to be equal to a desired steering ratio, wherein the bandwidth is selectively adjusted to control a rate of change of the commanded steering ratio.

18. The system of claim 17, wherein the instructions further cause the processor to, in response to decreasing the bandwidth of the non-linear filter, determine at least one of a vehicle speed of the vehicle and a throttle position of a throttle of the vehicle.

19. The system of claim 18, wherein the instructions further cause the processor to further decrease the bandwidth of the non-linear filter based on the at least one the vehicle speed of the vehicle and the throttle position of a throttle of the vehicle.

20. The system of claim 17, wherein non-linear filter includes a first order digital filter.

\* \* \* \* \*